United States Patent [19]

White et al.

[11] Patent Number: 4,872,742

[45] Date of Patent: Oct. 10, 1989

[54] IMAGING SYSTEMS FOR MAINTAINING CONSTANT THE INTENSITY OF AN OUTPUT IMAGE

[75] Inventors: Henry J. White; Christopher Stace, both of Bristol, England

[73] Assignee: British Aerospace Public Limited Company, London, England

[21] Appl. No.: 77,245

[22] Filed: Jul. 24, 1987

[30] Foreign Application Priority Data

Jul. 25, 1986 [GB] United Kingdom ................. 8618219

[51] Int. Cl.⁴ ............................................. G02F 1/13
[52] U.S. Cl. .................................... 350/348; 350/342
[58] Field of Search ................................ 350/348, 342

[56] References Cited

U.S. PATENT DOCUMENTS 3,980,403  9/1976  Pollack ................................. 350/342
4,227,201 10/1980  Grinberg et al. ..................... 350/342
4,351,589  9/1982  Chavel et al. ........................ 350/348
4,481,531 11/1984  Warde ................................. 350/342
4,707,077 11/1987  Marom ................................ 350/342

Primary Examiner—John S. Heyman
Assistant Examiner—Huy Kim Mai
Attorney, Agent, or Firm—Cushman, Darby & Cushman

[57] ABSTRACT

An imaging system for maintaining the intensity of an output image constant, where the output image corresponds to a viewed scene. A focusing device forms an input image of the viewed scene on a variable grating modulation device. The viewed scene is then read from the focusing device and a scene intensity distribution pattern formed of two histograms is formed. One of these histograms is processed to produce an output image which has a constant range of intensity levels as adjusted using one of the intensity level of the one histogram.

6 Claims, 3 Drawing Sheets

IMAGING SYSTEMS FOR MAINTAINING CONSTANT THE INTENSITY OF AN OUTPUT IMAGE

This invention relates to imaging systems and is particularly concerned with imaging systems in which a constant intensity output image is required.

According to the present invention, there is provided an imaging system for maintaining constant the intensity of an output image corresponding to a viewed scene, the system comprising:

variable grating modulation means;

focussing means for forming an imput image of the viewed scene on the variable grating modulation means;

imaging means for reading the input image and for forming a scene intensity distribution pattern corresponding to the input image; and output means for processing the scene intensity distribution pattern to produce an output image of the viewed scene, the output image having a constant range of intensity levels which is not dependent on any change in intensity of the viewed scene.

Advantageously, the scene intensity distribution pattern comprises two histograms both corresponding to the input image of the viewed scene.

Preferably, the output means includes variable fiter means for modifying the scene intensity distribution pattern to produce the constant range of intensity levels of the output image.

The imaging system may further include monitoring means for monitoring the scene intensity distribution pattern and focussing the information so obtained to control the variable filter means.

The variable filter means may be a filter wheel which has variable transmission characteristics and which is rotated to give a desired transmission characteristic. Alternatively, the variable filter means may be a liquid crystal device whose transmission characteristics can be altered.

For a better understanding of the invention, reference will now be made, by way of example, to the accompanying drawings in which.

Figure 1:
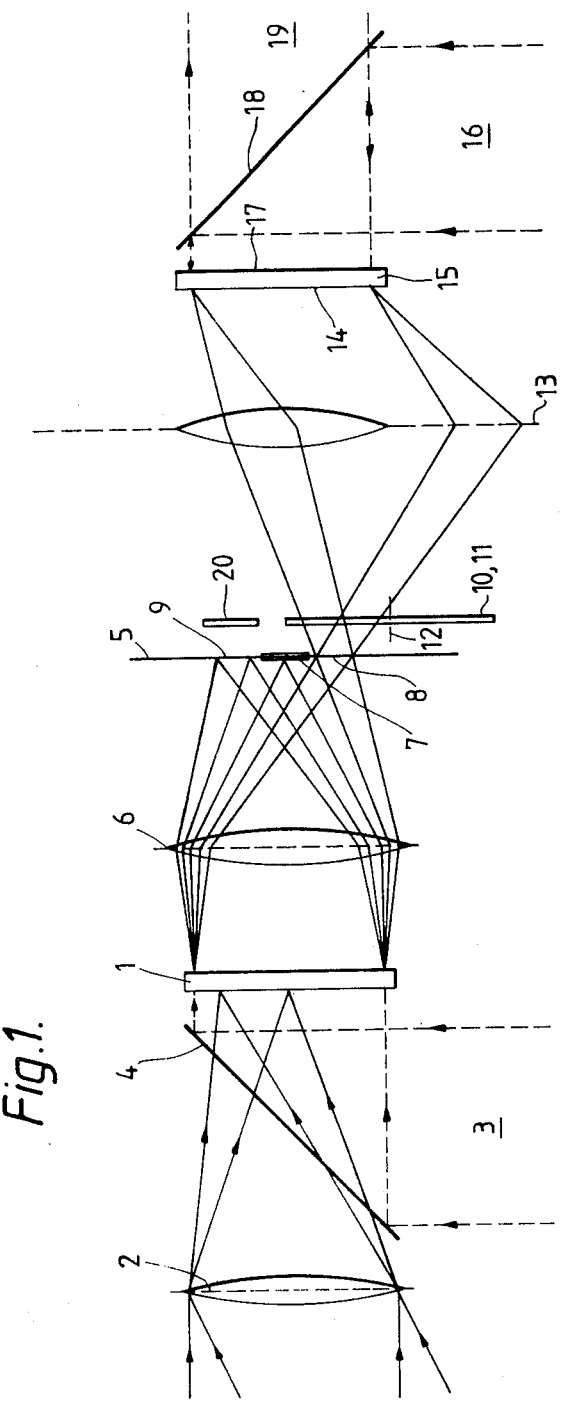
FIG. 1 is a schematic diagram of an imaging system incorporating a variable grating mode (VGM) device.
Figure 2:
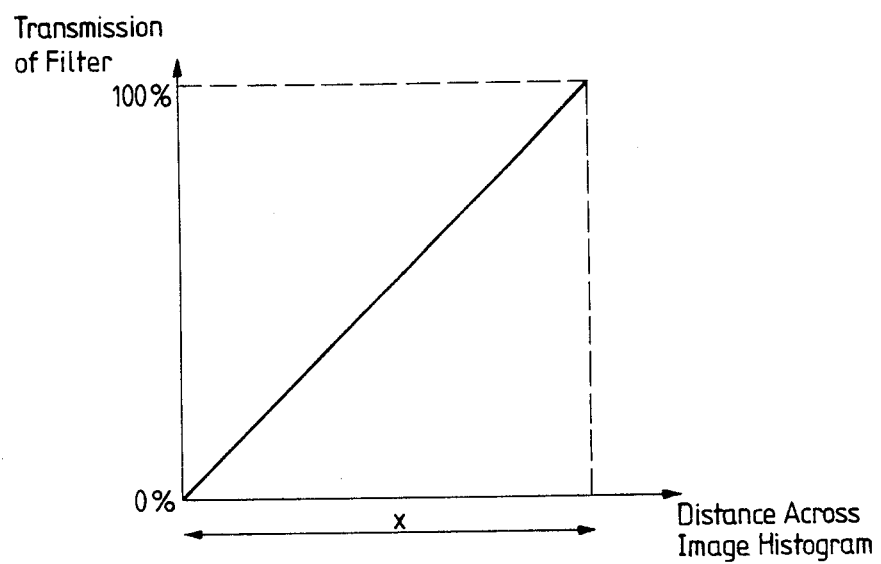
FIG. 2 is a graph showing transmission characteristics of a filter used in the FIG. 1 system.

The imaging system of FIG. 1 comprises a variable grating mode (VGM) device 2 which is positioned to receive an image of a viewed scene, the image being formed by an imaging arrangement shown schematically as a lens 2. A 'read' beam 3 (shown in dotted lines) is directed onto the VGM 1 by a beamsplitter 4 so that the image formed on the VGM can be read and an output corresponding to the image obtained. The output from VGM 1 is focussed onto a plane 5 by a lens 6, and forms a scene intensity distribution pattern in that plate, the distribution pattern being a diffraction pattern containing the zeroth and first orders. A zeroth order or d.c. blocking filter 7 is arranged to remove the zeroth order pattern i.e. the brightest pattern to prevent the pattern being swamped. The presence of the blocking filter 7 splits the diffraction pattern into two first order diffraction patterns or histograms 8, 9. Each histogram corresponds to the image of the viewed scene. Light from the lower histogram 8 is then reformed into the image of the viewed scene by passing it through a neutral density filter 10. The transmission characteristics of the filter 10 across the histogram 8 is given in FIG. 2 i.e. the transmission varies from 0% to 100% across the width, x, of the diffraction histogram 8. Depending on the output required, the maximum transmission of the filter 10 may be positioned at either end of the histogram 8.

Figure 3:
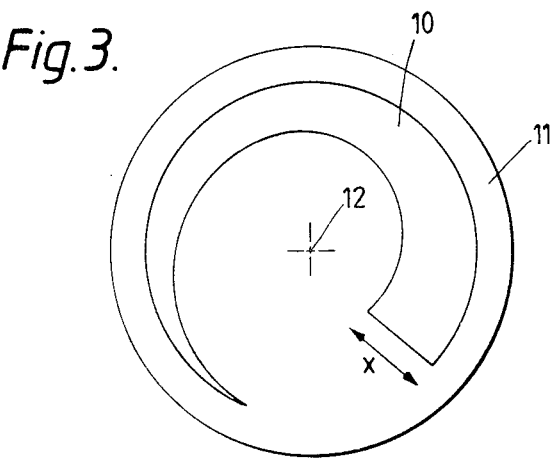
FIG. 3 is a schematic diagram of a variable profile filter used in the FIG. 1 system.

The filter 10 is shown in more detail in FIG. 3. The filter is formed on a wheel 11 and is profiled along its length having its maximum width, x, corresponding to the width of the first order diffraction pattern. The wheel 11 is rotatable about its centre 12 to enable the desired transmission characteristics to be selected according to the relative position of the histogram 8 and the filter 10.

The light emerging from the filter 10 is then re-imaged by lens 13 on a light sensitive device such as a 'write' surface 14 of a spatial light modulator (SLM) 15. A further 'read' beam 16 (shown in dotted lines) is directed onto a 'read' surface 17 of the SLM 15 via a further beamsplitter 18. The 'read' beam is then reflected from the surface 17 to form an output beam 19 which is passed to other processing equipment (not shown).

The intensity of the image formed on the 'write' surface 14 of the SLM 15 depends on the intensity of the 'read' beam 3 and the transmission characteristics of the filter 10. By using a 'read' beam of a given constant intensity and a filter 10 having particular transmission characteristics, the intensity of the image formed on the surface 14 can be altered. The contrast of this image can also be altered depending on the maximum and minimum transmission characteristics of the filter 10.

However, as the range of intensities of the viewed scene changes, there will be corresponding changes in the image formed on the VGM 1 and the diffraction pattern formed on the plane 5. If the range of intensities and contrast of the image formed on the surface 14 of the SLM 15 and hence of the output beam 19 are to be maintained at given levels i.e. constant, the transmission characteristics of the filter 10 must be altered. This is achieved by using the upper histogram 9 to indirectly monitor the intensity and contrast of the viewed scene. Light from the histogram 9 is made incident on the array of a charge coupled device (CCD) 20. The output from the CCD 20 is passed to a computer or logic circuit which uses the output to control the transmission characteristics of the filter 10 i.e. the output is used to rotate the wheel 11 to the desired position to maintain the intensity and contrast of the image incident on the SLM 15 and hence the output beam 19.

By using a neutral density filter to reconstruct the image, the whole image can be reconstructed. This is in comparison to using a shutter which only allows light of certain intensities to pass through and hence be reconstructed.

Figure 4:
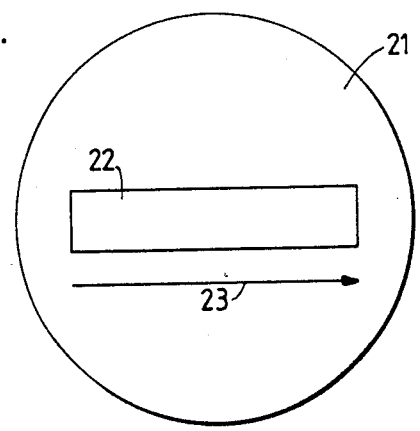
FIG. 4 is a schematic diagram of a liquid crystal device which may be used instead of the FIG. 3 filter.

As an alternative to the filter 10, a liquid crystal device 21 as shown in FIG. 4 can be used. In this case, the neutral density filter is produced by varying the voltage across the device to alter the transmission characteristics of the liquid crystal material 22, and the variable transmission characteristic varies from 0% to 100% in the direction of the arrow 23.

Naturally, discrete filter elements may replace the profiled arrangement of the filter 10, but this may not give sufficient range for the transmission characteristics appropriate for the dynamic intensity range of the viewed scene.

Figure 5:
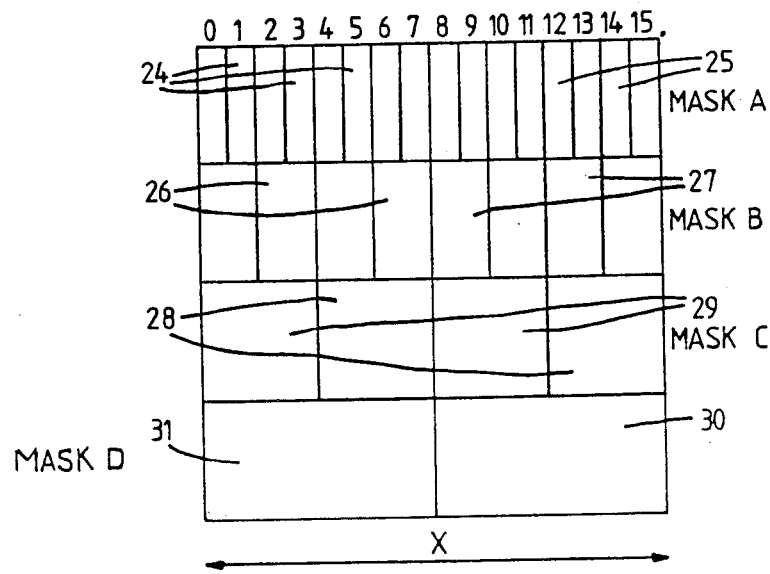
FIG. 5 is a schematic diagram of a mask arrangement for digital encoding of the image.

The system described may be used with digital processing equipment. In this case, the filter 10 is replaced by masks as shown in FIG. 5. In FIG. 5, the masks correspond to a histogram width, x, of sixteen grey levels, and four masks are required to encode the sixteen grey levels. The first mask, mask A, has alternatively positioned transmissive regions 24 and non-transmissive regions 25, each region corresponding to one of the sixteen grey levels. The second mask, mask B, is similar to mask A, but its transmissive and non-transmissive regions, 26 and 27 respectively, each correspond to two adjacent grey levels. Similarly in masks C and D, the transmissive regions are 28 and 30 corresponding to four and eight adjacent grey levels respectively and the non-transmissive regions are 29 and 31 respectively. The four masks could either be addressed serially i.e. the first mask A, then mask B, mask C and then mask D or they could be addressed in parallel by splitting the light incident on the masks into four identical portions using beamsplitters. The output images then obtained would correspond to different significant bits of the digitally encoded image. For example, if the output obtained from the four masks were as given below:

mask A 0
mask B 1
mask C 1
mask D 0 where 0 and 1 refer to non-transmission and transmission respectively, the grey level encoded would be level 6. Naturally, the number of grey levels dictates the number of masks e.g. for 8 grey levels only three masks are required, and for 32 grey levels, five masks are required i.e. the number of grey levels can be expressed as $2^N$ where N is the number of masks required.

The VGM, when operated at constant bias conditions may produce constant non-linearities in the histogram. These non-linearities may be removed by the filtering system to produce a true representation of the viewed scene. Similarly, detectors such as a CCD array or a TV camera will have their own non-linear response to intensity which may also be corrected by the filtering system to produce a true representation of the viewed scene.

The filter 10 in plan 5 could be used to create output images having a standard intensity histogram, these images could then be used in digital image processing. Similar filters could produce arbitary intensity histograms for image processing purposes.

Naturally the light sensitive device does not have to be a SLM as described above and could be a TV camera or a charge-coupled device array which produce an output directly.

The system as described is particularly useful for sensors, for example SLMs and cameras for robotic vision, which have limited dynamic range.

We claim:

1. An imaging system for maintaining constant the intensity of an output image corresponding to a viewed scene, the system comprising:
    variable grating modulation means;
    focusing means, disposed with an optical path to said variable grating modulation means, for forming an input image of the viewed scene on the variable grating modulation means;
    imaging means, coupled to said focusing means, for reading the input image from said focusing means and for forming a scene intensity distribution pattern corresponding to the input image, wherein the scene intensity distribution pattern comprises two histograms each corresponding to the input image of the viewed scene; and
    output means, coupled to said imaging means, for processing the scene intensity distribution pattern from said imaging means to produce an output image of the viewed scene, the output image having a constant range of intensity levels which is not dependent on any change in intensity of the viewed scene.

2. An imaging system for maintaining constant the intensity of an output image corresponding to a viewed scene, the system comprising:
    variable grating modulation means;
    focusing means, disposed with an optical path to said variable grating modulation means, for forming an input image of the viewed scene on the variable grating modulation means;
    imaging means, coupled to said focusing means, for reading the input image from said focusing means and for forming a scene intensity distribution pattern corresponding to the input image; and
    output means, coupled to said imaging means, for processing the scene intensity distribution pattern from said imaging means to produce an output image of the viewed scene, the output image having a constant range of intensity levels which is not dependent on any change in intensity of the viewed scene, wherein the output means includes variable filter means for modifying the scene intensity distribution pattern to produce a constant range of intensity levels of the output image.

3. A system according to claim 2 further comprising monitoring means for monitoring the scene intensity distribution pattern and focussing the information so obtained to control the variable filter means.

4. An imaging system for maintaining constant the intensity of an output image corresponding to a viewed scene, the system comprising:
    variable grating modulation means;
    focusing means, having an optical path to said variable grating modulation means, for forming an input image of the viewed scene on the variable grating modulation means;
    imaging means, coupled to said focusing means, for reading the input image and for forming a scene intensity distribution pattern comprising two histograms, both corresponding to the input image of the viewed scene;
    variable filter means, coupled to said imaging means, for modifying the scene intensity distribution of one of the histograms to produce an output image having a constant range of intensity levels; and
    monitoring means for monitoring the scene intensity distribution pattern of the other of the two histograms and effecting control of the variable filter means whereby said constant range of intensity levels of the output image is produced.

5. A system according to claim 4, wherein the variable filter means is a filter wheel which has variable transmission characteristics and which is rotated to give a desired transmission characteristic.

6. A system according to claim 4 wherein the variable filter means is a liquid crystal device with alterable transmission characteristics.

* * * * *